US009009110B2

(12) United States Patent
Brunswig et al.

(10) Patent No.: US 9,009,110 B2
(45) Date of Patent: Apr. 14, 2015

(54) DECLARATIVE VIEW OBJECTS

(75) Inventors: Frank Brunswig, Heidelberg (DE); Thomas John, Weinheim (DE); Daniel Goldmann, Mannheim (DE); Otfried Geisau, Sinsheim (DE); Christian Haas, Heidelberg (DE); Sandra Schmidt, Bruchsal (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/338,797

(22) Filed: Dec. 28, 2011

(65) Prior Publication Data

US 2013/0173549 A1   Jul. 4, 2013

(51) Int. Cl.
*G06F 7/06*   (2006.01)
*G06F 17/30*   (2006.01)
*G06F 11/36*   (2006.01)

(52) U.S. Cl.
CPC ............ *G06F 17/30* (2013.01); *G06F 11/3672* (2013.01)

(58) Field of Classification Search
CPC . G06F 11/3664; G06F 11/3672; G06F 17/30; G06F 8/20
See application file for complete search history.

(56) References Cited

U.S. PATENT DOCUMENTS

| 8,429,630 B2 * | 4/2013 | Nickolov et al. ............. 717/148 |
| 2008/0120129 A1 * | 5/2008 | Seubert et al. .................... 705/1 |
| 2008/0126409 A1 * | 5/2008 | Weber et al. ............... 707/104.1 |

OTHER PUBLICATIONS

Urbano, "Oracle Database Advanced Replication 11g Release 2 (11.2)", Retrieved from the Internet: <URL:http://docs.oracle.com/cd/E14072_01/server.112/e10706.pdf>.

* cited by examiner

*Primary Examiner* — Bruce Moser
(74) *Attorney, Agent, or Firm* — Mintz Levin Cohn Ferris Glovsky and Popeo, P.C.

(57) ABSTRACT

A view object is generated in a target deployment unit in a design time environment of a metadata repository. The view object is modeled on a business object of a source deployment unit. The source deployment unit includes process components of a business application that is physically decoupled from the target deployment unit. A subset of attributes of the business object of the source deployment unit is selected. The subset of attributes includes at least an outbound agent and an inbound agent implemented by a generic messaging framework. The view object is modeled in the target deployment unit with the subset of attributes of the business object. The inbound agent of the view object is configured for receiving a replication message from the outbound agent of the business object, and the replication message includes replication data for configuring the view object only with data from the business object.

15 Claims, 7 Drawing Sheets

DECLARATIVE VIEW OBJECTS

BACKGROUND

This disclosure relates generally to declarative view objects, and more particularly to a system and method to model a view object as business object projection in a metadata repository in which persistent attributes of the business object nodes can be used in the projection.

To execute and complete complex business scenarios, it is often necessary to access information from business objects (BOs) located in different Deployment Units (DUs). A DU represents a set of process components that could be operated on a separate system isolated from other process components so that different deployment units can be instantiated completely decoupled on different physical systems. For instance, there are some simple use cases in which it is required to reference a BO of another DU in order to realize search and validations. Or, in more complex use cases, it may be required to have information from a BO of another DU in order to prepare or execute a follow-up process. Furthermore, there are use cases in which information from a BO of another DU is required in order to easily show data on a user interface (UI) in the context of a "local" BO.

EXAMPLES

1. Search and Validation: Projects are replicated to Time and Labor Management (TLM) in order to create an employee specific work list for time recording.
2. Prepare a follow-up process: Projects are replicated to Financials (FIN) in order to realize project costing and enable usage of projects as accounting objects.
3. Realize a follow-up process: Project related time confirmations, expense reports, goods and service receipts and supplier invoices are replicated to Project Management (PRO) and stored in Project Expense View as basis for project invoicing.
4. Show data on UI: Project related purchase requests and orders are replicated to PRO and stored in Project Purchase Request to visualize purchase request/orders in context of the project Today, these problems are often solved by introducing so-called "view objects." View objects are mirror objects of a "master" BO in another DU, by which data of the "master" business object is replicated to the DU that requires the information; often by enriching the view object with additional information from the receiving DU. In some implementations, the data replication is achieved using a process agent framework.

View objects are used mainly for compliance to local architecture guidelines, robustness standards, and fast data access (i.e. local access) as well as requirements for partner enhancements. For example, the SAP Business ByDesign ("ByD") platform vertical architecture is based on a three tier approach consisting of a database tier, an application tier, and a user interface tier. In the ByD implementation, the entire application logic runs in an ABAP application server based on business objects. From the horizontal architecture perspective, the platform is divided into a number of units that are decoupled through process management because the flexible deployment of platform processes in partial scope scenarios or for third party integration is a key asset for the platform.

Figure 1:
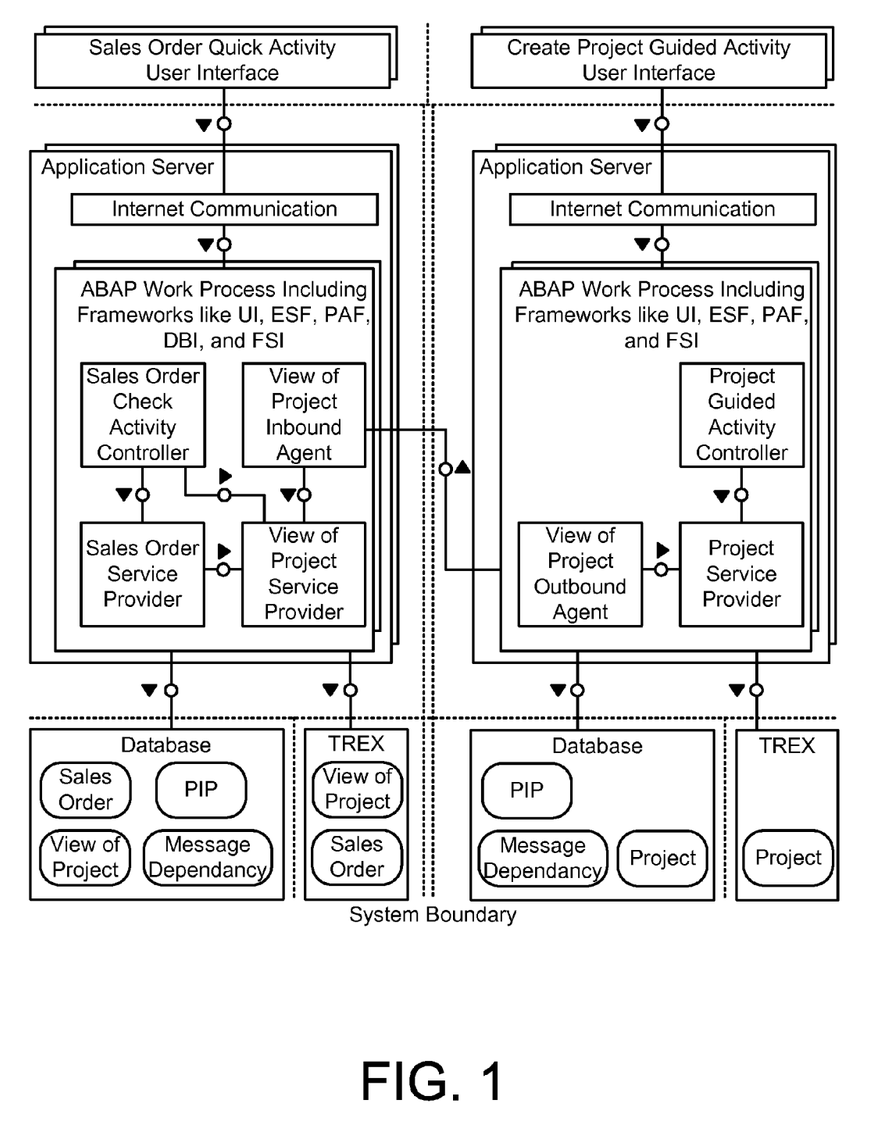
FIG. 1 illustrates a system topology of a business application platform.

FIG. 1 illustrates a system architecture of a simplified business example of such a platform. The business example shown in FIG. 1 consists of the Customer Relationship Management (CRM) and Project Management (PM) DUs. The example is based on the Sales Order Quick Activity user interface with the use case to create a sales order with a reference to a project. This use case leads to requirements to search for allowed and existing projects and to validate a project identifier used in a sales order.

Currently, cross-DU communication is based on application-to-application (A2A) or business-to-business (B2B) web services supported by a process agent framework (PAF). In the SAP ByD solution, for example, all DUs used to be deployed in a single system, but this situation has been changed with the introduction of networked applications which are running in separate systems but also need process integration in the existing ByD platform.

Figure 2:
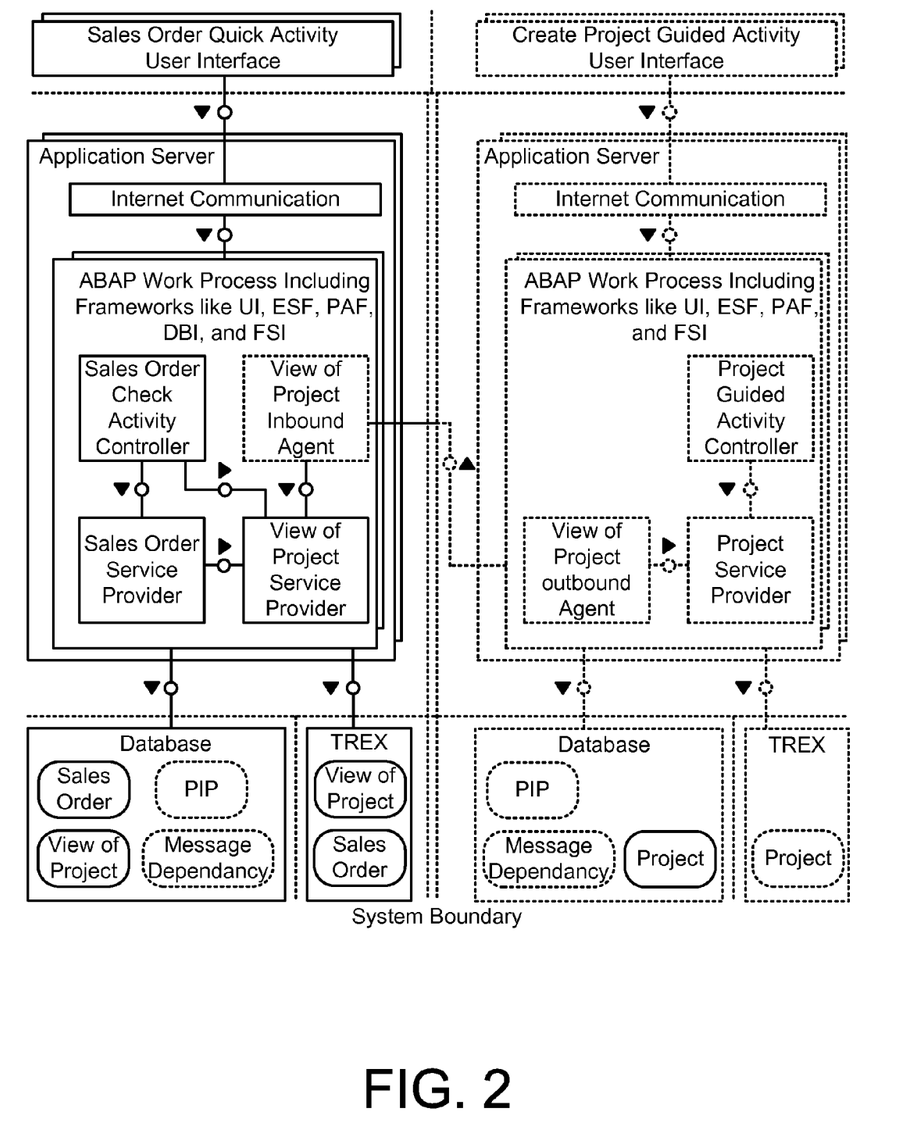
FIG. 2 shows the create order example using a quick activity floorplan bound which is bound to the sales order quick activity controller.

FIG. 2 shows a "create order" example using a quick activity floorplan, which is bound to the sales order quick activity controller. The sales order quick activity uses the sales order as a leading BO. If the project identifier in the sales order BO is modified, then the project identifier will be validated by the sales order service provider via a local consumer proxy (LCP) lookup in the replicated view of project. The replicated object can be accessed only in read only mode. All attribute properties of the view of project business object are read only and the node properties create enabled, update enabled, and delete enabled are disabled. In addition, value help on the user interface is provided via a fast search infrastructure (FSI) query based on a text mining system, such as SAP's Text Retrieval and Extraction (TREX) system. A basic assumption for this scenario is that all project related data is replicated from the project management DU to the CRM DU.

Figure 3:
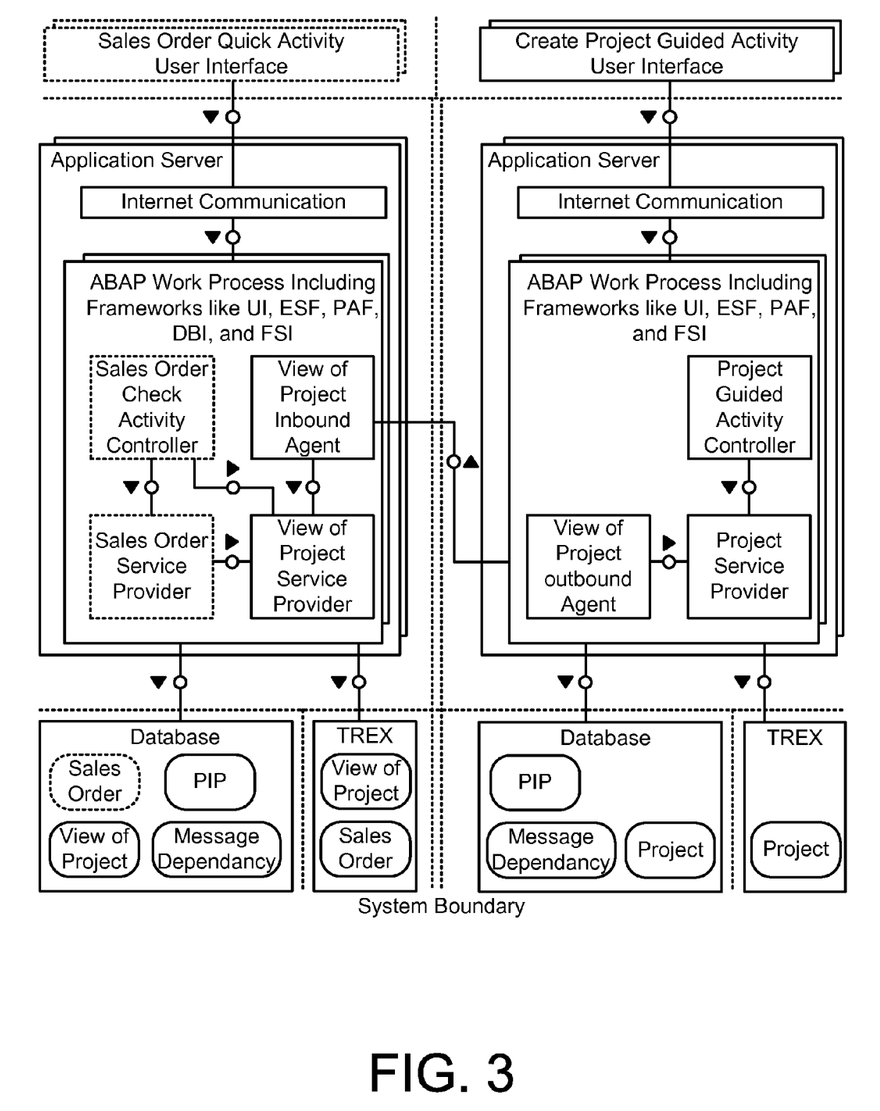
FIG. 3 shows a "create project" example with replication.

The replication process of the project BO is realized via process integration. FIG. 3 shows a "create project" example with replication. The project is created with the Create Project guided activity. When the project is saved the "View of Project" outbound agent is triggered. The outbound agent reads all replication relevant data from the project BO and calls the View of Project inbound agent via the process agent framework. The View of Project inbound agent creates a new instance of the View of Project BO in the CRM DU. When the View of Project BO is saved, the replicated data is stored in the View of Project database schema and will also be replicated to the TREX.

Figure 4:
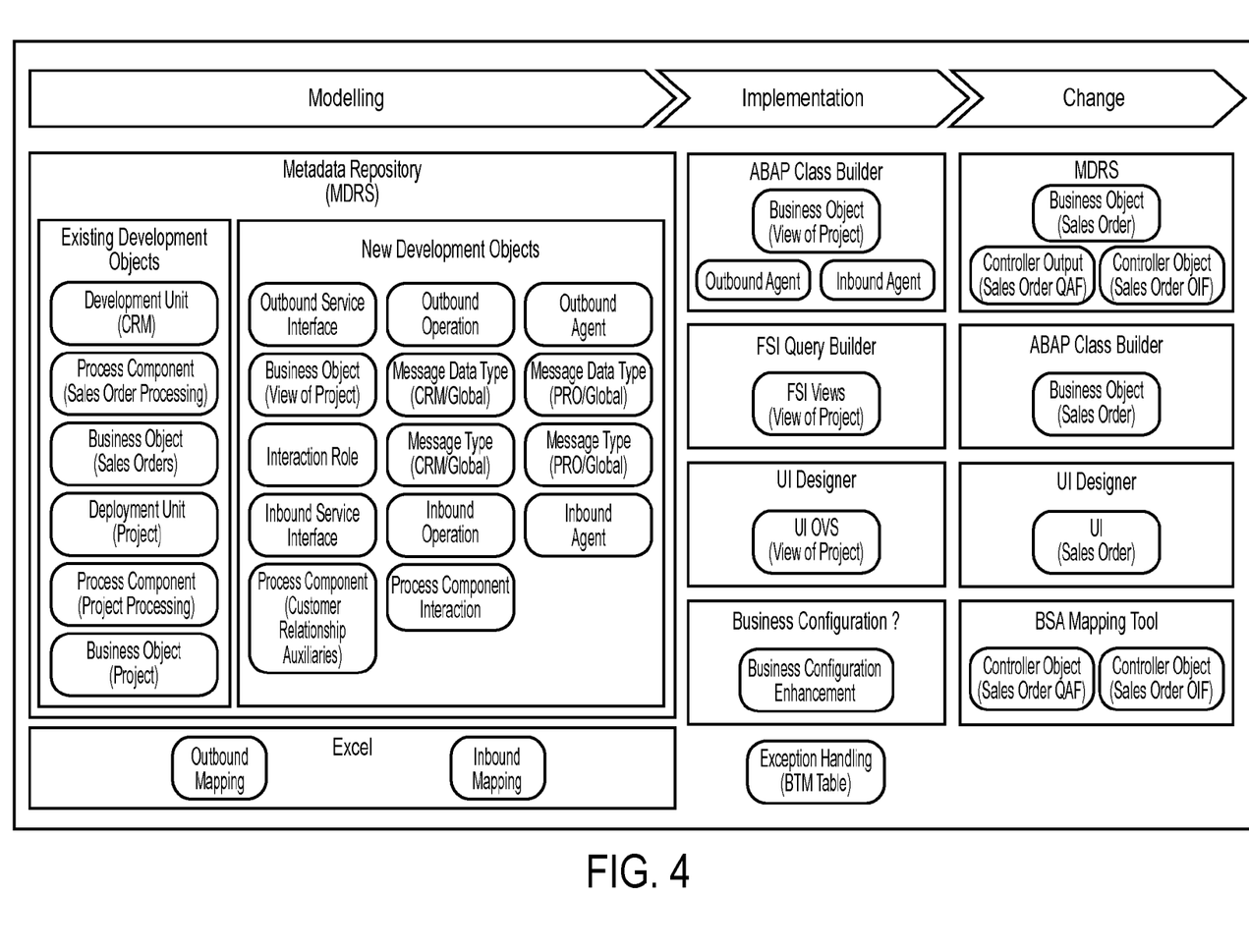
FIG. 4 illustrates the development artifacts for view objects.

The development of the described scenario including the replication of the data requires many development artifacts that must be modeled, implemented, and/or changed. FIG. 4 illustrates the development artifacts for view objects. The large number of artifacts that must be manually maintained leads to an unreasonable amount of effort for such a scenario. For example, an estimation of effort for the example described above is at 60 person days using conventional systems: modeling fourteen new development objects in the metadata repository, two mappings must be modeled in Excel. In addition, more than six development objects must be implemented and seven development objects must be changed. All these entities must be provided, including design, governance, testing, and documentation.

SUMMARY

In one aspect, a method includes generating, in a target deployment unit, a view object in a design time environment of a metadata repository. The view object is modeled on a business object of a source deployment unit. The source deployment unit includes a set of process components of a business application that is physically decoupled from the target deployment unit. The method further includes selecting a subset of attributes of the business object of the source deployment unit. The subset of attributes includes at least an outbound agent and an inbound agent implemented by a generic messaging framework. The method further includes modeling the view object in the target deployment unit with the subset of attributes of the business object. The inbound agent of the view object is configured for receiving a replication message from the outbound agent of the business object, and the replication message includes replication data for configuring the view object only with data from the business object.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes declarative view objects, in a system and method to model a view object as BO projection in a metadata repository in which persistent attributes of the BO nodes can be used in the projection. This means that it is not possible to add attributes that do not have their origin in the BO itself. All other entities such as actions, special associations other than the composition, and queries are not part of the projection per default and it is not possible to add them. The names of the projection for the view object and all other needed new artifacts follow a special naming convention which will be supported by the repository tools.

Based on this model information in the metadata repository, a service provider and persistency for the view object can be generated. This service provider is based on the BO processing framework which is responsible for the object relational mapping of the data at runtime. For each node a "query by elements" is supported. In addition, at least on a root node level a "select all" query is provided for the initial load of the TREX. The data is also replicated in the TREX.

For the replication of the view object, an outbound and inbound agent is implemented and provided by a generic framework based on business service adaptation (BSA). On each business process relevant "save" of the source BO, a replication outbound agent uses the model information of the projection in a runtime-optimized format to read the needed data for the replication from the source BO and to assemble the replication message. This message is then sent via the process agent framework to the corresponding generic inbound agent which disassembles the replication message and updates the view object. These special updates are protected by the replication context to ensure that only the inbound agent, and not the user interface, can change the data of the view object.

Modeling

In accordance with some implementations, the metadata repository supports a new BO category view object, which is preferably a BO with the constraints that the (replicated) view object must be located in another DU, only one view object per source DU and source BO is allowed, and the naming of all entities follows a naming convention. Further constraints are: only persistent attributes can be part of the projection; transient attributes, special associations, and actions are not supported; the attributes of the view object are read-only; the view object model is generated; and the service provider cannot be implemented but is provided by a generic framework. In still some implementations, generic context and constraint enables the weak property check for update, a query by elements is provided on each node, and the data is also replicated to TREX. At least one "select all" query is provided on a root node level. In preferred implementations, cross BO associations to master data are supported, extensibility is required but does not allow to replicate ACLs, and at least one business process variant type (BPVT) per sender and receiver is maintained.

The name of the view object is derived from the <name of the target process component>+"ViewOf"+<business object name>. The name of the process component can be derived from the <name of the deployment unit>+"ViewObjects".

Figure 5:
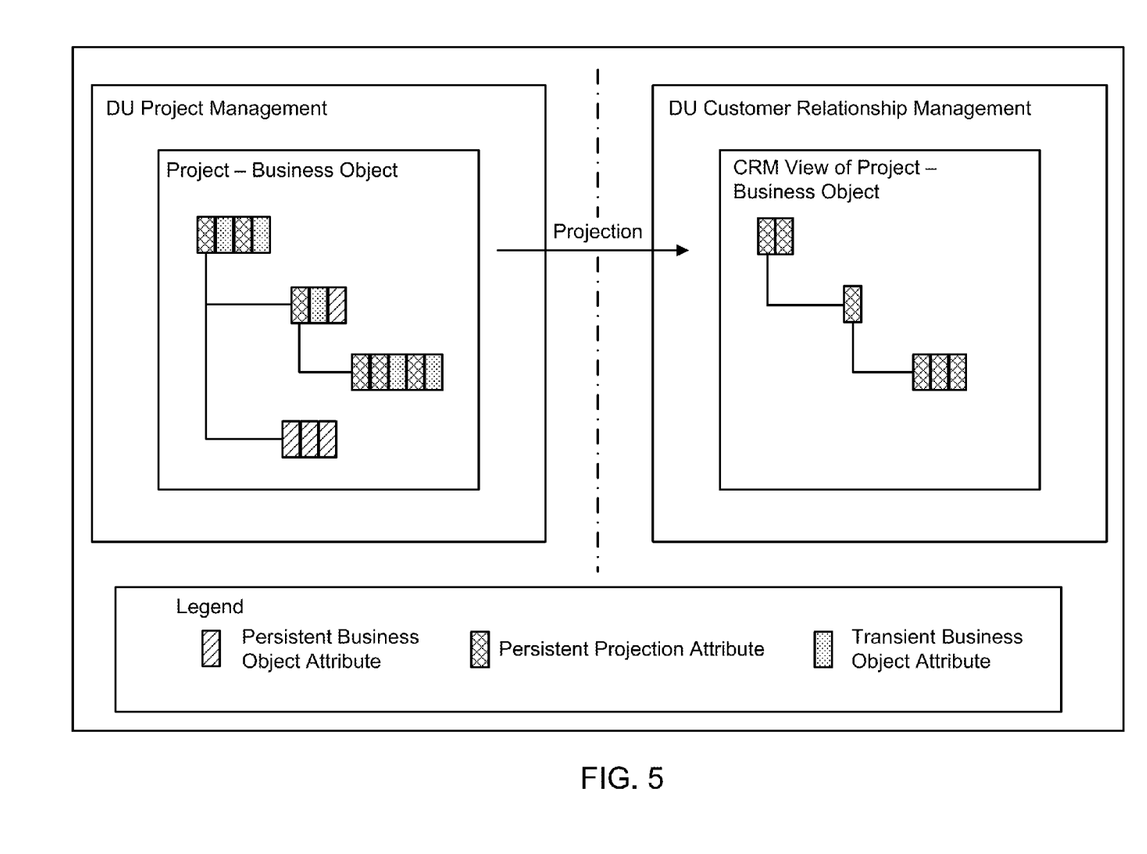
FIG. 5 shows an example of a simple projection view object.

FIG. 5 shows an example of a simple projection view object for the CRM View of Project in the Customer Relationship Management DU that is based on the Project BO in the Project Management DU.

The metadata repository design time provides a tool to create the projection of a view BO by selecting the needed BO attributes. In accordance with some implementations, all manually modeled development objects in FIG. 4 are generated using the following naming convention:

Process Component
Process Component Interaction
Interaction Role
Outbound Service Interface
Outbound Operation
Outbound Message Type
Outbound Agent
Inbound Service Interface
Inbound Operation
Inbound Message Type
Inbound Agent
View Business Object Additional the following development objects are also generated . . . .

Outbound Mapping as SADL
Inbound Mapping as SADL
BOPF Configuration
TREX Views

Runtime

The runtime part for the agents and the view BO is performed by asynchronous outbound and inbound agents according to the business service adaptation (BSA) and a view BO service provider and based on the BO processing framework (BOPF). Additional configuration data is stored in the metadata repository. This configuration data can be used at runtime in a performance- and memory-optimized runtime format, however there is no need for the view BO developer to configure these runtime artifacts.

Figure 6:
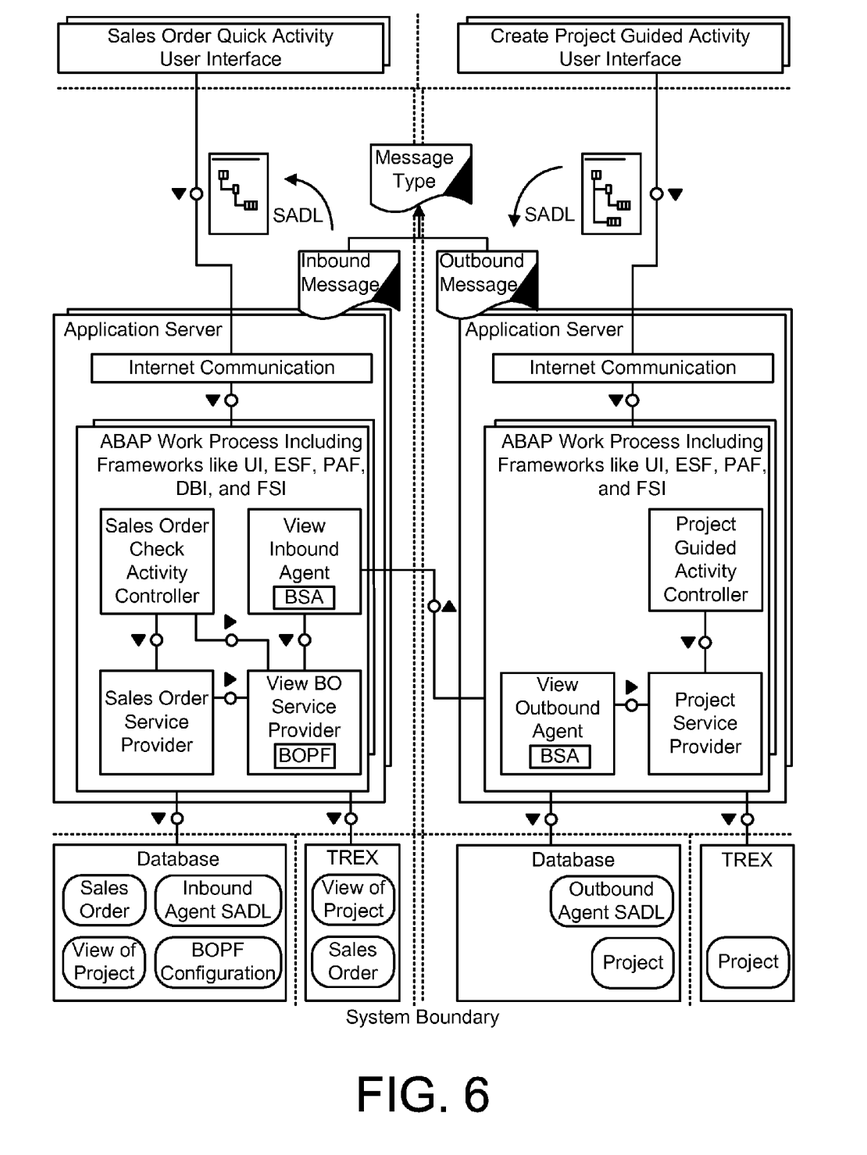
FIG. 6 illustrates a target architecture.

FIG. 6 illustrates a target architecture. The mapping from the source BO to the outbound message and the mapping from the inbound message to the view BO in the target DU is described by a service adaptation definition language (SADL). The outbound message type and the inbound message type have the same structure but have different names due to the fact that they need to be located in different independent software packages, but technically they are equal. At runtime the SADL is executed by an agent implementation using business service adaptation (BSA). These outbound and inbound agent parts are soon replaced by the modeled agent framework.

In the replication use case, the inbound agent sets the context "replication" with the constraint "service enabling" which allows the agent to modify the view BO. If this context is not set, any modification on the view BO will result in an exception. Per definition, view BOs are read-only for the standard consumer. The service provider of the view BO is implemented with the BO processing framework (BOPF) for the standard create, retrieve, update, and delete operations (CRUD). If TREX views are defined, then the TREX service provider is used for these queries. To support TREX, the view BO provides a select_all query which is implemented by BOPF using the primary database persistency. The select_all query is needed for the initial load of the TREX. The replication can also depend on a start, change, cancel condition (status) for the outbound agent so that not every save of the source BO will lead to the replication. These conditions can be modeled and executed in the generic outbound agent implementation.

Depending on the scenario, the agents can implement complete transmission or delta handling. PIP entries are required to support reconciliation and, in case of delta handling, to determine action codes.

The initial load is done by means of the PI Upgrade Framework, which triggers reconciliation messages for all affected instances after the downtime. By doing so, the PIP is created correctly from the beginning and the downtime is not prolonged by additional XPRAs. Nevertheless it must be considered that some BO instances might be missing in the target DU for a short period of time after the upgrade, until all reconciliation messages are triggered and processed.

In the standard user interface use case, the view BO can be used in any read-only scenario including object value selection. Foreign key associations can also serve as a target to the view BO. Additional business logic must be provided in a separate BO which refers to or uses the view BO. The model enrichment of view BOs is not supported and must be realized by a separate BO which belongs to the right process component.

View objects are not role-based authorization management (RBAM) relevant and cannot be used on stack level one in a local consumer proxy (LCP) call, i.e., for example, in a user interface. View objects are allowed to be used only in a privileged mode. Accordingly, a view BO cannot be a primary BO in the user interface. If it is joined then the authorities of the primary BO will be inherited.

The design time support depends on the partner development tools, and the public solution part of the source BO is available to define a view BO if it does not yet exist. If it does exist then the view BO shall be extended via standard extensibility capabilities including the inbound and outbound agents. In the partner layer, an existing view BO can be extended by selecting additional needed fields of the source BO. All model and configuration enhancements are generated by the infrastructure. In this use case an initial (delta) load for the extended attributes in the view BO is required. The replication of the view object is realized by an outbound and inbound agent, and the associated message may lead to inconsistencies between the source BO and the view BO. Data Flow Verification (DFV) detects inconsistencies in various BOs of one single system instance.

These inconsistencies are a potential source of incidents. DFV can be used to check and clean up the view objects when the root cause of the inconsistency is known and has been fixed. Since the view objects model information is in the metadata repository and available, and the service provider and the persistency for the view object is generated, the necessary DFV predefined content (mapping and consistency conditions) should be also stored in the MDRS (MO DFV). The DFV constraint that only BO pairs can be compared is also fulfilled because only one view object per source DU is allowed. At runtime (DFV MDRO is scheduled regularly) the generic DFV framework can then, based on the generated content, read the relevant parts of the source BO and compare the data with the replicated view BO. In case of detected inconsistencies, the DFV can trigger a reconciliation message from the source to the target object to remove the inconsistency.

Figure 7:
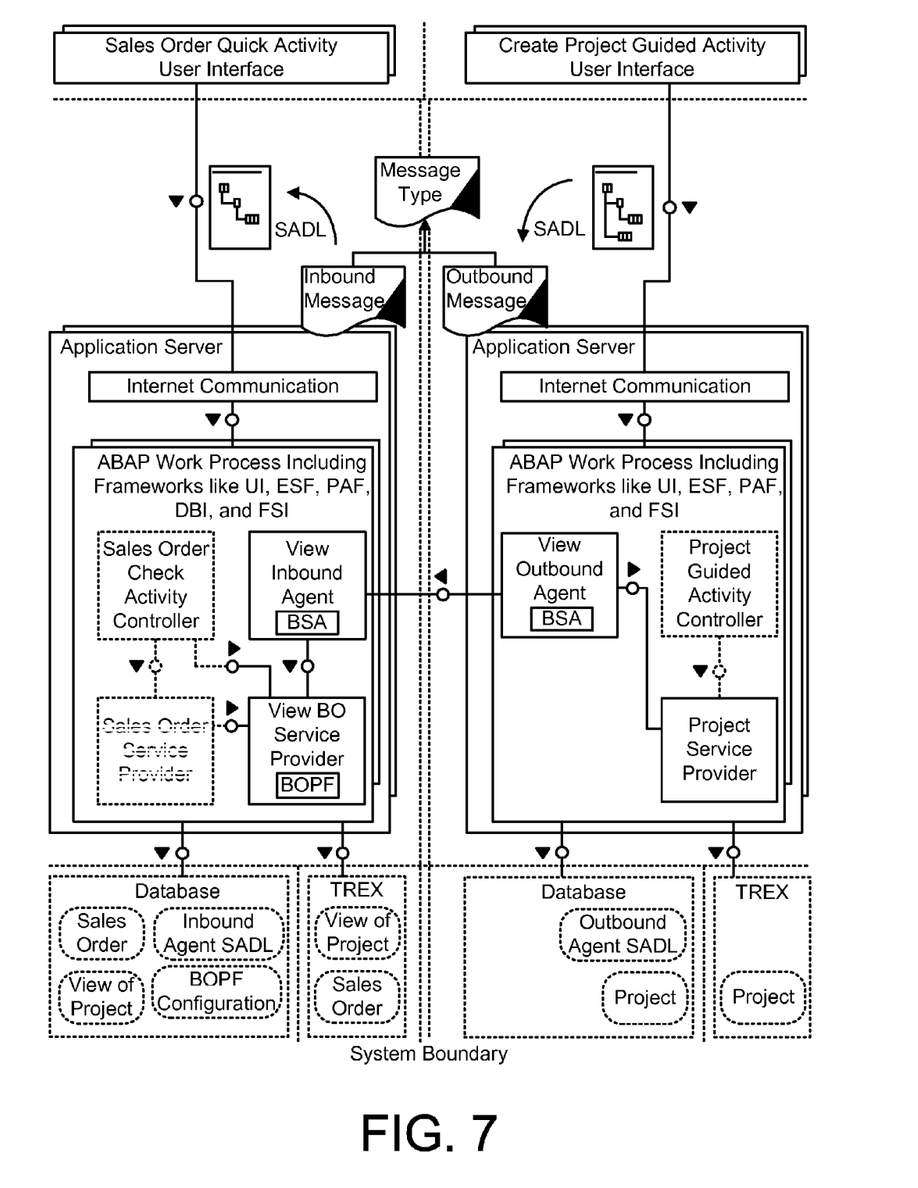
FIG. 7 illustrates potential sources of inconsistencies between the BO Project and the View of Project.

FIG. 7 shows the potential sources of inconsistencies between the BO Project and the View of Project. The basic assumption is here that RC DFV is working also between different systems instances and the concept is not part of this document. The comparison logic checks the BO/View pair for existence of specific nodes and the correctness of attributes on these nodes.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVDROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method comprising:
generating, in a first application server of a target deployment unit comprising a first front-end user interface and a first database that is connected to the first front-end user interface via the first application server, a view object in a design time environment of a metadata repository, the view object being modeled on a business object of a source deployment unit comprising a second front-end user interface, a second database, and a second front application server connecting the second front-end user interface with the second database, the source deployment unit comprising a set of process components of a business application that is physically decoupled from the target deployment unit;
selecting a subset of attributes of the business object of the source deployment unit, the subset of attributes including data characterizing at least an outbound agent and an inbound agent implemented by a generic messaging framework, the first application server of the target deployment unit executing the outbound agent, the first user interface of the target deployment unit configured to display a first set of data associated with the outbound agent, the first database of the target deployment unit configured to store a second set of data associated with the outbound agent, the second application server of the source deployment unit executing the inbound agent, the second user interface of the source deployment unit configured to display a first set of data associated with the inbound agent, the second database of the source deployment unit configured to store a second set of data associated with the outbound agent; and
modeling the view object in the target deployment unit with the subset of attributes of the business object, the inbound agent of the view object for receiving a replication message from the outbound agent of the business object, the replication message including replication data for configuring the view object only with data from the business object.

2. The method in accordance with claim 1, wherein generating the view object in the design time environment further includes generating a service provider and persistency for the view object in a metadata repository.

3. The method in accordance with claim 2, wherein the service provider is based on a business object processing framework.

4. The method in accordance with claim 3, wherein the business object processing framework handles object-relational mapping of the view object at runtime.

5. The method in accordance with claim 1, wherein the source deployment unit is configured to execute a single view object that comprises replicated data that is a replica of at least some data in the target deployment unit, the single view object being the view object.

6. The method in accordance with claim 5, wherein the replicated data is associated with only persistent attributes.

7. The method in accordance with claim 6, wherein the replicated data is not associated with transient attributes, special associations, and actions.

8. A computer program product comprising a non-transitory machine-readable medium storing instructions that, when executed by at least one programmable processor, cause the at least one programmable processor to perform operations comprising:
   generating, in a target deployment unit, a view object in a design time environment of a metadata repository, the view object being modeled on a business object of a source deployment unit, the source deployment unit comprising a set of process components of a business application that is physically decoupled from the target deployment unit, each of the source deployment unit and the target deployment unit comprising a front-end user interface, a database, and an application server connecting the front-end user interface with the database;
   selecting a subset of attributes of the business object of the source deployment unit, the subset of attributes including data characterizing at least an outbound agent and an inbound agent implemented by a generic messaging framework, the application server of the target deployment unit executing the outbound agent, the user interface of the target deployment unit displaying a first set of data associated with the outbound agent, the database of the target deployment unit configured to store a second set of data associated with the outbound agent, the application server of the source deployment unit executing the inbound agent, the user interface of the source deployment unit configured to display a first set of data associated with the inbound agent, the database of the source deployment unit configured to store a second set of data associated with the outbound agent; and
   modeling the view object in the target deployment unit with the subset of attributes of the business object, the inbound agent of the view object for receiving a replication message from the outbound agent of the business object, the replication message including replication data for configuring the view object only with data from the business object.

9. The computer program product in accordance with claim 8, wherein the operation to generate the view object in the design time environment further includes an operation to generate a service provider and persistency for the view object in a metadata repository.

10. The computer program product in accordance with claim 9, wherein the service provider is based on a business object processing framework.

11. The computer program product in accordance with claim 10, wherein the business object processing framework handles object-relational mapping of the view object at runtime.

12. A system comprising:
   at least one programmable processor associated with an application server; and
   a machine-readable medium storing instructions that, when executed by the at least one processor, cause the at least one programmable processor to perform operations comprising:
      generating, in a target deployment unit, a view object in a design time environment of a metadata repository, the view object being modeled on a business object of a source deployment unit, the source deployment unit comprising a set of process components of a business application that is physically decoupled from the target deployment unit, the source deployment unit comprising a front-end user interface, a database, and an application server connecting the front-end user interface with the database, the target deployment unit comprising another front-end user interface, another database, and another application server connecting the another front-end user interface with the another database;
   selecting a subset of attributes of the business object of the source deployment unit, the subset of attributes including data characterizing at least an outbound agent and an inbound agent implemented by a generic messaging framework, the application server of the source deployment unit executing the inbound agent, the user interface of the source deployment unit configured to display a first set of data associated with the inbound agent, the database of the source deployment unit configured to store a second set of data associated with the outbound agent, the another application server of the target deployment unit executing the outbound agent, the another user interface of the target deployment unit configured to display a first set of data associated with the outbound agent, the another database of the target deployment unit configured to store a second set of data associated with the outbound agent; and
   modeling the view object in the target deployment unit with the subset of attributes of the business object, the inbound agent of the view object for receiving a replication message from the outbound agent of the business object, the replication message including replication data for configuring the view object only with data from the business object.

13. The system in accordance with claim 12, wherein operation to generate the view object in the design time environment further includes generating a service provider and persistency for the view object in a metadata repository.

14. The system in accordance with claim 13, wherein the service provider is based on a business object processing framework.

15. The system in accordance with claim 14, wherein the business object processing framework handles object-relational mapping of the view object at runtime.

* * * * *